(12) United States Patent
Lu

(10) Patent No.: US 7,827,303 B1
(45) Date of Patent: Nov. 2, 2010

(54) LOOP PROTECTION FOR A PROTECTIVE PROXY

(75) Inventor: Haw-minn Lu, San Diego, CA (US)

(73) Assignee: Engate Technology Corporation, Reno, NV (US)

( * ) Notice: Subject to any disclaimer, the term of this patent is extended or adjusted under 35 U.S.C. 154(b) by 1226 days.

(21) Appl. No.: 11/227,704

(22) Filed: Sep. 14, 2005

Related U.S. Application Data

(60) Provisional application No. 60/609,611, filed on Sep. 14, 2004.

(51) Int. Cl.
G06F 15/16 (2006.01)

(52) U.S. Cl. .................... 709/237; 709/225; 370/230; 370/249

(58) Field of Classification Search ........... 709/237, 709/223–226, 227–229; 370/254–258, 229–240, 370/242, 244, 245, 248, 249, 252, 255, 401; 714/1, 2, 25, 47
See application file for complete search history.

(56) References Cited

U.S. PATENT DOCUMENTS

| | | | |
|---|---|---|---|
| 5,818,825 A * | 10/1998 | Corrigan et al. ............ 370/329 |
| 6,012,084 A * | 1/2000 | Fielding et al. ............ 709/205 |
| 6,128,305 A * | 10/2000 | Hjalmtysson et al. ....... 370/410 |
| 6,529,958 B1 * | 3/2003 | Oba et al. .................... 709/237 |
| 6,628,624 B1 * | 9/2003 | Mahajan et al. ............. 370/256 |
| 2002/0078371 A1 * | 6/2002 | Heilig et al. ................ 713/200 |
| 2002/0143855 A1 * | 10/2002 | Traversat et al. ............ 709/202 |

* cited by examiner

*Primary Examiner*—Joseph E Avellino
*Assistant Examiner*—Jackie Zuniga
(74) *Attorney, Agent, or Firm*—San Diego IP Law Group

(57) ABSTRACT

Protective proxies are used to shield a destination agent from undesirable source agents or transactions. Because protective proxies are usually tied to one but sometimes more fixed destination agents, they are usually configured directly to the destination agent. As a result, many protective proxies are lightweight and allow the destination agent to manage the protocol. As a result, a catastrophic condition can occur if the protective proxy is inadvertently misconfigured so that a connectivity loop occurs. A low level loop detected can be incorporated into the protective proxy. Alternatively, a loop detector which augments the existing application layer protocol can also be employed in a protective proxy.

13 Claims, 14 Drawing Sheets

```
#include <stdio.h>
#include <stdlib.h>
#include <unistd.h>
#include <fcntl.h>
include <sys/socket.h>
#include <netinet/in.h>
#include <sys/wait.h>
define COMM_PORT 6003 int main(int argc, char **argv);
extern int listen_socket(short);
extern int connect_socket(short,char *);

int main(int argc, char **argv)
{
  int listen_sock;
  int ret;
  fd_set fdset;
  pid_t pid;
  int newsock;
  struct sockaddr_in from;
  int fromlen=sizeof(from);

listen_sock=listen_socket(COMM_PORT);
  for (;;) {
    FD_ZERO(&fdset);
    FD_SET(listen_sock, &fdset);

ret = select(listen_sock+1, &fdset, NULL, NULL, NULL);
    newsock = accept(listen_sock, (struct sockaddr *)&from,&fromlen);
    if ((pid = fork()) == 0) { /* Child Process */
      close(listen_sock);
      newsock=connect_socket(COMM_PORT,argv[1]);
      sleep(60);
      exit(0); // Never reached
    }
    /* Parent Process */
    write(newsock,"HI\r\n",5);
    close(newsock);
  }
}
```

(PRIOR ART)

FIG. 4

```c
#include <stdio.h>
#include <stdlib.h>
#include <unistd.h>
#include <fcntl.h>
include <sys/socket.h>
#include <netinet/in.h>
#include <sys/wait.h>
define COMM_PORT 6003 int main(int argc, char **argv);
int listen_socket(short);
int connect_socket(short,char *);
int main(int argc, char **argv)
{
  int listen_sock;
  int ret;
  fd_set fdset;
  pid_t pid;
  int loop_detect=0;
  int newsock;
  int inout[2];
  int child;
  int hport;
  int len;
  struct sockaddr_in to,from;
  int fromlen=sizeof(from);
  int tolen=sizeof(to);;
  int parent;
  listen_sock=listen_socket(COMM_PORT);
  if(socketpair(AF_UNIX, SOCK_STREAM, 0, inout) < 0) exit(0);
  child=inout[1];
  parent=inout[0];
  if(fcntl(parent, F_SETFL, O_NONBLOCK) < 0) exit(0);
  for (;;) {
    FD_ZERO(&fdset);
    if(loop_detect==0) FD_SET(listen_sock, &fdset);

ret = select(listen_sock+1, &fdset, NULL, NULL, NULL);
    waitpid(-1,NULL,WNOHANG);
    len=read(parent,&hport,sizeof(hport));
    newsock = accept(listen_sock, (struct sockaddr *)&from,&fromlen);
    if(hport==from.sin_port) {
      close(newsock);
      close(listen_sock);
      loop_detect=1;
      fprintf(stderr,"Fatal Loop Detected\n");
      continue;
    }
    if ((pid = fork()) == 0) {
      close(listen_sock);
      newsock=connect_socket(COMM_PORT,argv[1]);
      getsockname(newsock,(struct sockaddr *)&to,&tolen);
      hport=to.sin_port;
      write(child,&hport,sizeof(hport));
      sleep(60);
      exit(0); // Never reached
    }
    write(newsock,"HI\r\n",5);
    close(newsock);
  }
}
```

FIG. 7

```c
#include <stdio.h>
#include <stdlib.h>
#include <unistd.h>
#include <fcntl.h>
include <sys/socket.h>
#include <netinet/in.h>
#include <sys/wait.h>
#include "detectloop.h"
#define COMM_PORT 6003
int main(int argc, char **argv);
extern int listen_socket(short);
extern int connect_socket(short,char *);

int main(int argc, char **argv)
{
  int listen_sock;
  int ret;
  fd_set fdset;
  pid_t pid;
  int loop_detect=0;
  int newsock;
  struct sockaddr_in from;
  int fromlen=sizeof(from);
  listen_sock=listen_socket(COMM_PORT);
  init_detectloop();
  for (;;) {
    FD_ZERO(&fdset);
    if(loop_detect==0) FD_SET(listen_sock, &fdset);

ret = select(listen_sock+1, &fdset, NULL, NULL, NULL);
    sleep(1);
    newsock = accept(listen_sock, (struct sockaddr *)&from,&fromlen);
    if(check_detectloop(&from)) {
      close(newsock);
      close(listen_sock);
      loop_detect=1;
      fprintf(stderr,"Fatal Loop Detected\n");
      continue;
    }
    if ((pid = fork()) == 0) {
      close(listen_sock);
      newsock=connect_socket(COMM_PORT,argv[1]);
      report_detectloop(newsock);
      sleep(60);
      exit(0); // Never reached
    }
    write(newsock,"HI\r\n",5);
    close(newsock);
  }
}
```

FIG. 8A

```c
/*
 * detectloop.c
 */ include <fcntl.h>
include <sys/socket.h>
#include <sys/select.h>
#include <netinet/in.h>
#include <unistd.h>
#include <stdlib.h>
#include "detectloop.h"
#include <stdio.h>
static int parent911;
static int child911;
static int hport;
void init_detectloop()
{
  int inout[2];
  if(socketpair(AF_UNIX, SOCK_STREAM, 0, inout) < 0) {
    fprintf(stderr,"Error\n");
    exit(0);
  }
  child911=inout[1];
  parent911=inout[0];
  hport=0;
  if(fcntl(parent911, F_SETFL, O_NONBLOCK) < 0) {
    fprintf(stderr,"Error\n");
  }
}
boolean check_detectloop(struct sockaddr_in *from)
{
  int len;
  len=read(parent911,&hport,sizeof(hport));
  if(len<0) {
    hport=0; //TBD ERROR
  }
  if(hport==from->sin_port) return(TRUE);
  return(FALSE);
}
void report_detectloop(int newsock)
{
  struct sockaddr_in to;
  int tolen=sizeof(to);
  int port;
  if(getsockname(newsock,(struct sockaddr *)&to,&tolen) < 0) {
    fprintf(stderr,"Error\n");
  }
  port=to.sin_port;
  write(child911,&port,sizeof(port));
}
```

FIG. 8B

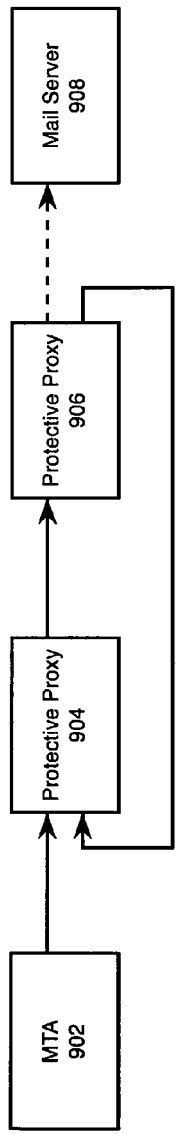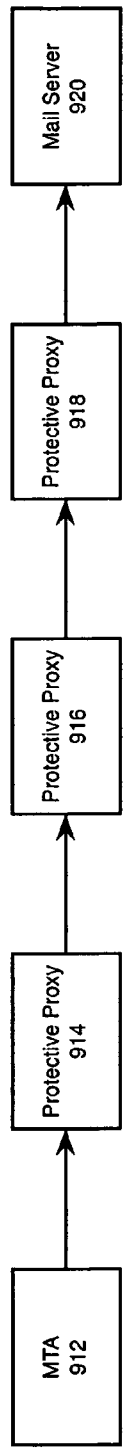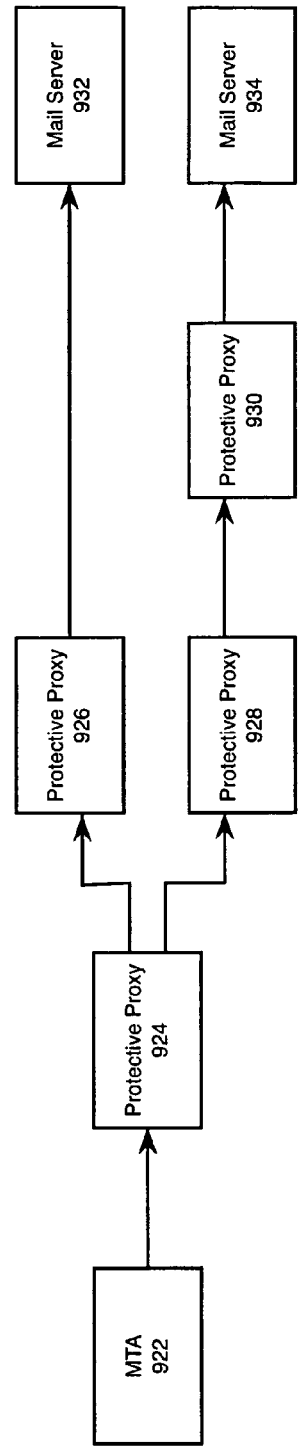
FIG. 9A
FIG. 9B
FIG. 9C

LOOP PROTECTION FOR A PROTECTIVE PROXY

RELATED APPLICATIONS INFORMATION

This application claims priority under 35 U.S.C. §119 to U.S. Provisional Patent Application Ser. No. 60/609,611 entitled, "A non-protocol socket level loop detector," filed on Sep. 14, 2004, which is incorporated herein by reference in its entirety as if set forth in full.

BACKGROUND OF THE INVENTION

1. Field of the Inventions

The present invention relates to network agents which relay traffic from a source to a destination and specifically to eliminating catastrophic loops.

2. Background Information

Certain network agents facilitate the transfer of information between two other network agents over a network and are often referred to as a source agent and a destination agent. They can include network appliances, applications and other systems. Amongst these are proxies, which serve as an intermediary between a source agent and a destination agent and often shield the destination agent from a potential hostile source agent or a source agent's identity from a questionable destination agent.

A transfer proxy or transfer agent serves as an independent intermediary network agent between a source agent and a destination agent. In general, a transfer proxy has little relationship to either source or destination agents although some Internet Service Provider's (ISP) offer a Hypertext Transfer Protocol (HTTP) transfer proxy for the exclusive use of their customers. In contrast, a protective proxy serves as an intermediary specifically designed to protect one and sometimes more destination agents. Protective proxies serve a similar function to firewalls but are typically protocol specific, protecting a destination agent using an application layer protocol. Protective proxies include monitoring agents that do not necessarily intervene in information transfer but simply monitor traffic and connection management appliances such as Engate MailSentinel™ by Engate Technology Corporation.

One of the great concerns in a system with multiple agents including proxies is the existence of loops. In environments such as email, email can be relayed through a number of mail transfer agents (MTAs). In the case of email, MTAs receive entire email messages and retransmit them to the next destination agent, which could be another MTA relaying the email message further, or to a mail server where an end user can read it. A web proxy operates similarly, in that HTTP requests are received and retransmitted to the next destination agent, which can be another proxy or a web server. In this case, the consequence of a loop is that a given message remains in limbo forever as it circulates through the loop. With each message entering the loop this problem increases proportionately. Most systems implement a "hop count" solution, whereby as part of the message, usually as part of the header, a count of how many systems have relayed the given message is included. When this hop count exceeds a threshold, the message is assumed to be lost in a loop and deleted without further relaying. Furthermore, the loops encountered tend to be on a message-by-message basis. For example, a loop may only occur when a sender sends an email message to joe@generic.com, so not all messages loop.

A protective proxy, in contrast, generally performs little to no routing, especially if it is designed to protect a single destination agent. As a result, in the configuration of a protective proxy, the network address or other connection information of the destination agent is specified. In such a case, the protective proxy is connected only to one destination agent and a permanent loop can occur due to misconfiguration.

For example, FIG. 1A (prior art) depicts a simple loop in a system whereby protective proxy 104 is misconfigured to relay traffic from a source agent 102 to itself rather than to the destination agent 106. (The intended connection is designated by a dotted line.) Often, the unintended misconfiguration is caused by machine names that are very similar. As a result, this type of misconfiguration can occur frequently. FIG. 1B (prior art) depicts a more complicated system where messages are passed between many protective proxies. In this example, a loop is introduced by protective proxy 116, not by unintentionally looping back to itself, but to protective proxy 114, rather than the intended destination agent 118.

Typically, the protective proxy is placed either physically or logically between a network agent and the Internet. In many ways, it functions as a protocol specific firewall. For example, a sentinel such as Engate MailSentinel™ by Engate Technology Corporation can be placed between the Internet and a mail server. It is designed to protect the mail server from unsolicited commercial email (UCE). Because protective proxies are typically assigned to a single destination agent or in some cases to a few destination agents, protective proxies are often streamlined to relay packets without necessarily having to fully understand the protocol being screened. For example, in the case of electronic mail (email; henceforth mail refers to electronic mail), a protective proxy needs to understand only those Simple Mail Transfer Protocol (SMTP) messages that are related specifically to mail delivery. Other SMTP messages, such as administrative messages, need not be understood and can merely be relayed to the mail server.

FIG. 2A (prior art) depicts a typical-scenario where protective proxy 204 monitors all mail to mail server 206. In operation when protective proxy 204 receives an email request from any MTA 202, it immediately requests a connection to mail server 206. By being a low level relay, protective proxy 204 enables MTA 202 and mail server 206 to communicate using an SMTP protocol without requiring protective proxy 204 to have the ability to interpret SMTP. When a mail message is determined to be undesirable, protective proxy 204 intervenes and either terminates all connections between MTA 202 and mail server 206 or completes the transactions between MTA 202 and mail server 206, independently reporting to MTA 202 that a bad message was attempted and also reporting to mail server 206 that the session should be aborted and ignored.

FIG. 3 (prior art) depicts the operation of a typical monitoring agent or equivalent transfer agent such as a proxy. Upon startup at step 302, the agent performs any required initialization at step 304. At step 306, the agent listens to a rendezvous port and typically binds a listening socket to this port. The agent then waits for an event at 308. This event can be an attempt to connect to the listening socket by an external agent such as an MTA or an unrelated event associated with other potential functions of the agent, such as internal communications, timers, interactions with a control interface or other stimuli. If at step 310, the event is determined to be of the latter category, the required service is performed at step 312, and the cycle repeats by returning to step 306. If on the other hand, the event results from an external agent that is contacting the rendezvous port, the connection is accepted at step 314, which when using a standard socket library causes both the external agent and the monitoring agent to continue the transaction on a port different than the rendezvous port. The monitoring agent can now communicate to the external agent through a transaction port which is often bound to a socket. Furthermore, a child process is spawned or forked, and after the spawning, the parent process closes the transaction socket and returns to listening at step 306 so that it might service new external agent requests before the current session is completed. Meanwhile the child process connects to its destination agent at step 332. It then proceeds to allow the service between the external agent and the destination agent to continue until completion at step 334. The child process then exits at step 336.

FIG. 4 (prior art) presents exemplary code implementing the basic components of the process described in FIG. 3, where listen_socket and connect_socket are functions built off the standard listen and connect socket commands.

FIG. 5A (prior art) shows how SMTP messages are passed between MTA 202 and mail server 206 through protective proxy 204. It should be noted that when MTA 202 first establishes connection 502 with protective proxy 204, protective proxy establishes connection 504 to mail server 206. However, if the protective proxy 204 is misconfigured to connect to itself a catastrophic loop can occur.

FIG. 2B depicts a system where protective proxy 204 is erroneously configured to connect to protective proxy 204 rather than mail server 206. In such a situation a single email can cause a catastrophic cascading failure. As shown in FIG. 5B (prior art), in this situation, when MTA 202 establishes connection 572 with protective proxy 204, it establishes connection 574 to protective proxy 204 rather than mail server 206, which is seen by protective proxy 204 as a connection from another MTA so it establishes connection 576 again to protective proxy 204, and so on. Eventually, protective proxy 204 runs out of resources and becomes unusable. While a simple solution is to determine the Internet Protocol (IP) address of protective proxy 204 and verify it does not relay to that IP address, there are situations in a Local Area Network (LAN) environment where the protective proxy is behind a firewall and is the recipient of port forwarding or is in the Demilitarized Zone (DMZ) of a firewall. In any case, the IP address seen externally is not the same IF address for which the protective proxy is configured. Such a solution would have limited utility.

The major difficulty with other approaches is that the catastrophic cascading failure takes place before any high level transaction occurs. Low level solutions may be a possibility but would necessitate modifications in lower levels of the communications stack or even the modification of the underlying operating system kernel. Furthermore, past techniques have relied on tagging forward moving messages with a hop count. However, for lightweight protective proxies, most of the protocol interpretation is left to the agent being protected. As a result, communications are established with the protected agent very early in the transaction if not immediately, thereby making hop counts impractical if the protocol does not explicitly support them.

DESCRIPTION OF FIGURES

Features, aspects, and embodiments of the inventions are described in conjunction with the attached drawings, in which:

FIG. 4 (prior art) presents exemplary code implementing the basic components of the process described in FIG. 3;

FIG. 7 is an exemplary coding example of the process depicted in FIG. 6;

FIG. 8A is an exemplary coding example of the process depicted in FIG. 6 using a loop detection library;

FIG. 8B is an exemplary coding example of the loop detection library;

FIG. 9A is a network diagram showing two protective proxies protecting a mail server misconfigured in a loop;

FIG. 9B is a network diagram showing three protective proxies protecting a mail server;

FIG. 9C is a network diagram showing protective proxies exhibiting a connectivity tree;

SUMMARY OF INVENTION

Figure 1A:
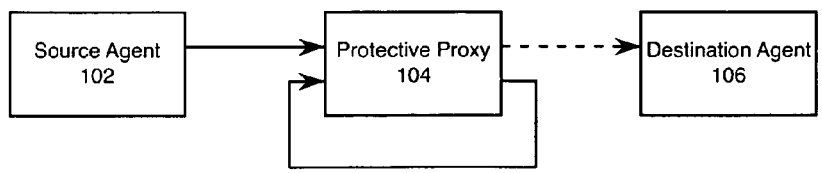
FIG. 1A (prior art) is a network diagram illustrating a protective proxy that is intended to protect a destination agent and that is misconfigured to loop to itself.

The present invention overcomes these and other deficiencies of the prior art by providing alternative methods of detecting loops.

In one aspect of the invention, a low level loop detector is incorporated into a protective proxy. This low level loop detector operates by reporting back to a parent process the transactional port (i.e., the port assigned for communications after agreement is made on a rendezvous port) used by a child process created to handle a session. If the parent process just established a session on that same transactional port as the one just created by the child process, a loop is likely.

In another aspect of the invention, a loop is detected by building connectivity information between a protective proxy and its destination agents. This connectivity information is built by augmenting the application layer protocol that the protective proxy is designed to monitor and/or protect. The protective proxy can examine the connectivity information to determine whether a loop exists.

Once a loop is detected, the protective proxy can take action to prevent a catastrophic failure including but not limited to refusing future connections and sending an error reply message to a source agent. Additionally, the protective proxy can be equipped with several criteria for clearing a loop-detected indication.

The foregoing, and other features and advantages of the invention, will be apparent from the following, more particular description of the embodiments of the invention, the accompanying drawings, and the claims.

DETAILED DESCRIPTION

Embodiments of the present invention and their advantages described below may be understood in context of TCP/IP protocols and in particular SMTP. Nonetheless, the invention is applicable to any type of socket communication (including User Datagram Protocol (UDP)) and any application layer protocol, including but not limited to HTTP, File Transfer Protocol (FTP), BitTorrent, Session Initiation Protocol (SIP), and secure shell (SSH). Furthermore by way of example, Engate MailSentinel™ by Engate Technology Corporation is used as an exemplary protective proxy (as described in U.S. patent application Ser. No. 10/761,894, filed on Jan. 20, 2004, U.S. patent application Ser. No. 10/761,864, filed on Jan. 20, 2004, U.S. patent application Ser. No. 10/761,883, filed on Jan. 20, 2004, now U.S. Pat. No. 7,490,128, and U.S. patent application Ser. No. 10/972,765, filed on Oct. 25, 2004, all four of which are hereby incorporated by reference in their entirety.

As mentioned above, the difficulty in applying past solutions to the loop detection, is that the cascading occurs prior to any high level information being passed through the connections. Therefore, there is no message to tag prior to the failure. Unfortunately, even at the Internet Protocol (IP) layer, insufficient address information exists in the incoming transaction to easily determine if a loop exists.

In the listen-accept transaction typical of socket server design, the server listens on a rendezvous port, but upon establishing communications with a client, the interaction is moved to a transaction port, which is assigned by the socket library. During any given transaction between the server and a single client, this transaction port is unique to this server-client session. By somehow allowing the child process described above and in FIG. 3 to relay this information to the parent process, a determination can be made as to whether a loop exists. If the last transaction port is the same as the port used by the connection just accepted then there is a loop in the system. Typically, a port is identified by number. For example, most machines reserve port 25 for SMTP transactions.

Figure 3:
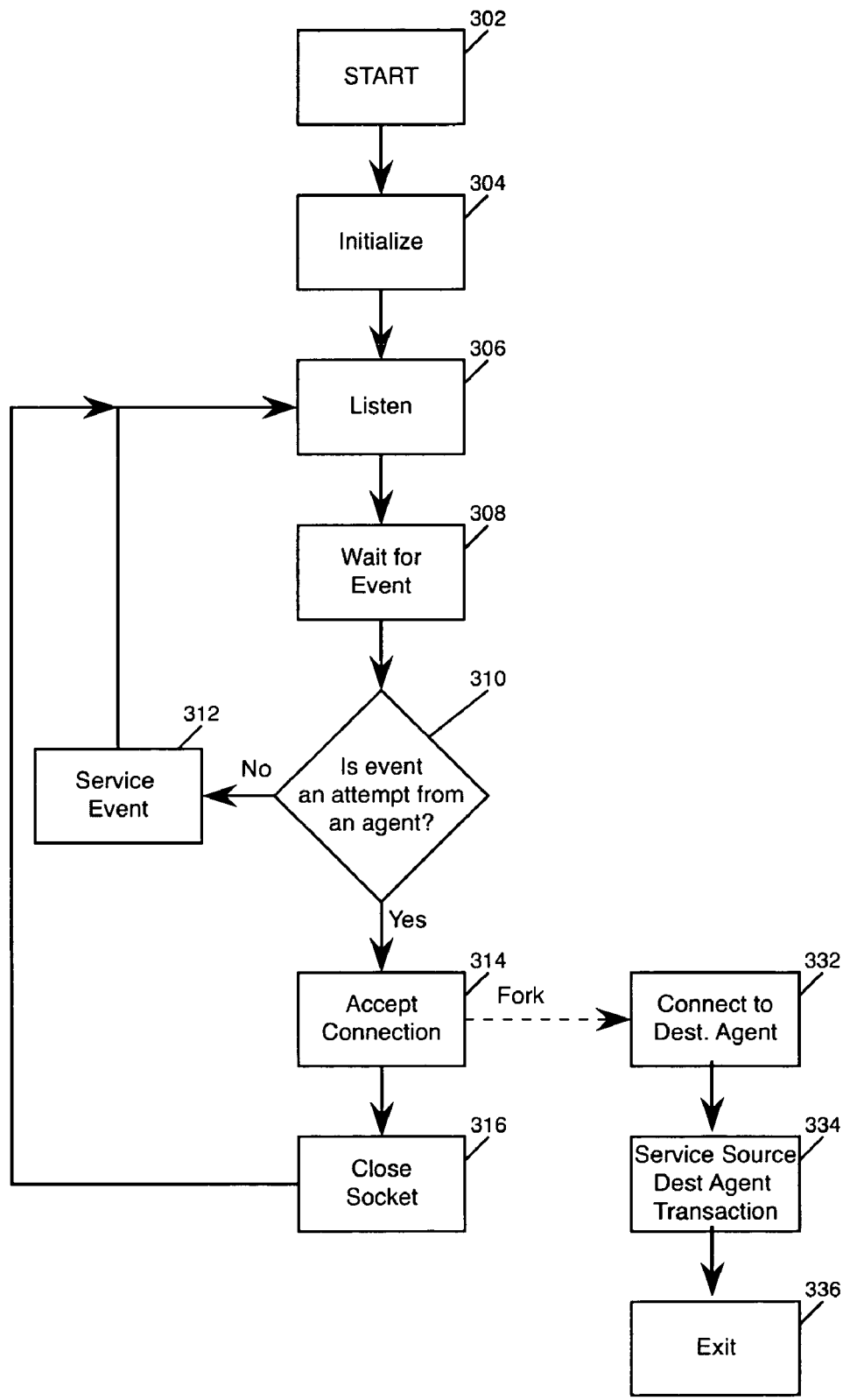
FIG. 3 (prior art) is a flow chart illustrating the operation of the protective proxy of FIG. 2.
Figure 6:
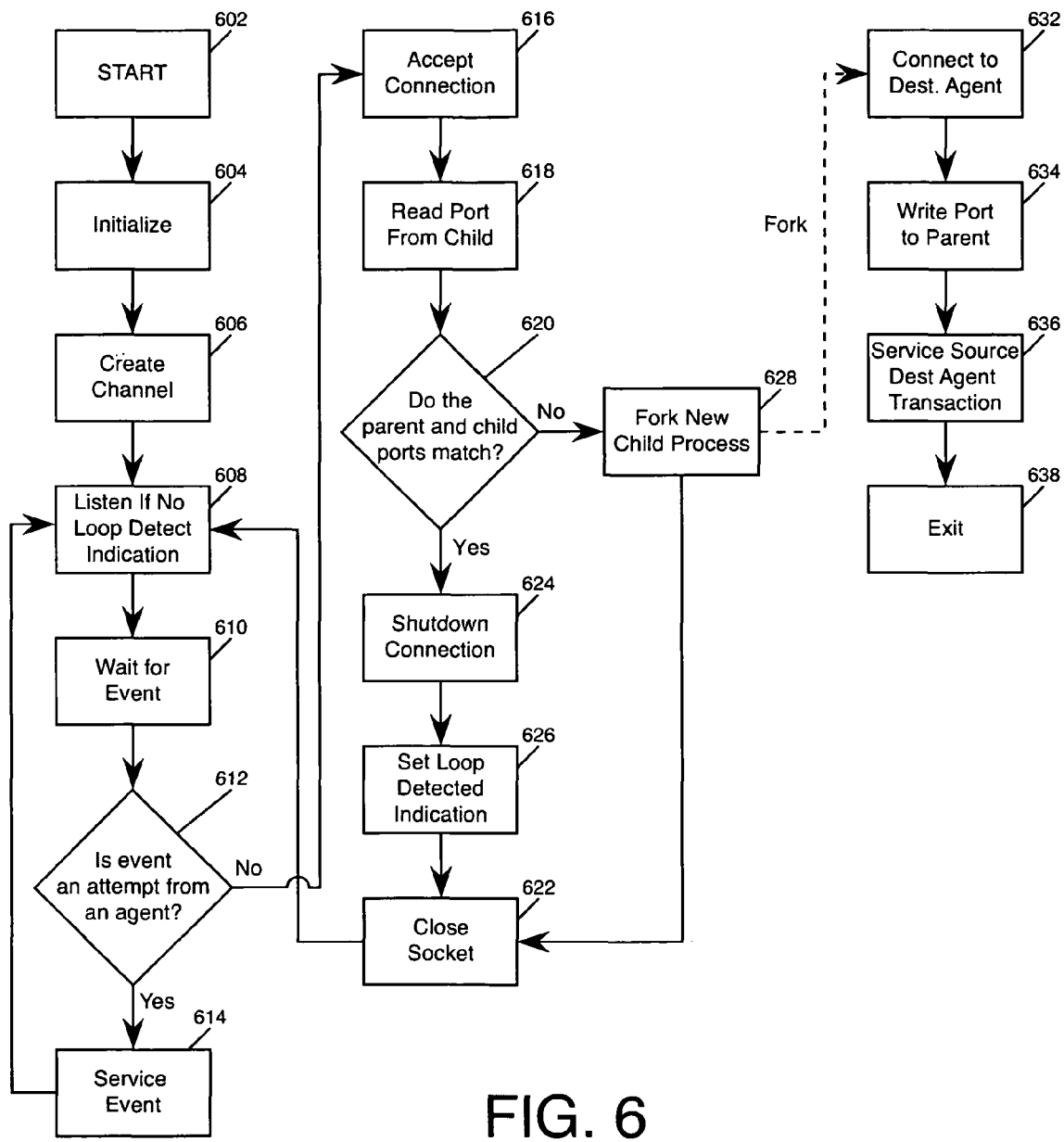
FIG. 6 is a flow chart illustrating the operation of an exemplary embodiment of a protective proxy equipped with a low level loop detector according to the invention.

FIG. 6 illustrates the same process as in FIG. 3 but modified to detect loops in the manner described above. Steps 602 and 604 are identical to step 302 and 304, respectively. In step 606, a channel is created to communicate between the parent and potential child processes. This can conveniently be accomplished with the socket library by creating a socket pair and reserving one of the pair for the parent and reserving the other for any potential child process. Step 608 is identical to listening in step 306, except that if a loop has been detected the agent ceases to listen in order to avoid the cascading failure configuration. At step 610, as in step 308, the agent waits for an event, and if the event requires servicing other than a connection attempt by an external agent to the rendezvous port then that service is performed at step 614 as it was in step 312. Upon an attempt by an external agent, the connection is accepted at step 616. At step 618, the parent process reads from the child process the transaction port used by the child process through the communication channel. In one embodiment, this channel can be a non-blocking socket, so that if no loop is detected the system does not wait for an input in the channel. In some embodiments, this step can occur prior to accepting the connection. If the child process is the last process attempting to connect to sentinel, this port read should have the same port number as returned by the accept operation in step 616. If the port numbers do match in step 620, there is a loop and the connection should be shutdown. Furthermore at step 626, a loop-detected indication can be set so that upon return to step 608 the listening can be disabled. This depends on the particular application. In the case of the Sentinel, the connection by the child process is always targeted towards the same destination agent. So if there is a misconfiguration, listening should be disabled until the proper configuration is implemented. In other applications, this destination agent can vary, so complete disabling of listening is not desired. If a loop is not detected, a child process is spawned at step 628, and the new socket is closed by the parent at step 622 so that it may resume listening at step 608.

Meanwhile, the child process operates the same as in FIG. 3, except with the addition of step 634 where the transaction port is sent via the communications channel. The port number can be obtained by use of the get sockname function when applied to the child's copy of the accepted connection. No additional logic is required by the child process in the event of a loop. If there is a loop, at step 636, the destination agent is the parent process from which the child was spawned. The parent process has shutdown the connection at step 624 so in a proper servicing at step 636 the child would tell the external agent that the destination agent has terminated the connection and no additional servicing is required. Whether there is a loop or not, the child terminates at step 638 after servicing at step 636 is completed.

FIG. 7 shows an exemplary coding example of the process depicted in FIG. 6. This example is based on the example shown in FIG. 4. Furthermore, FIG. 8A uses the same code as FIG. 7, but the loop detection is made transparent through the use of a loop detection library depicted in FIG. 8B.

While in the above example the child process communicates with the parent process through the use of a socket, many other types of interprocess communications (IPC) can be employed, including but limited to the use of shared memory, semaphores, pipes or SYSV IPC message queues. SYSV IPC are IPC functions originally associated with System V Unix, but that have been widely adopted by many operating systems. Furthermore, while the example shown involves separate processes, the same approach can be applied to multi-threaded processes, where a master thread monitors incoming requests, and a subordinate thread manages each session in a manner similar to that performed by the parent and child processes, respectively. In fact, the loop detection methodology can be applied even when a separate process or thread is not used to service each communication session.

In an alternate embodiment, when encountering a successful transaction, the child process can clear the values set in the channel to avoid a coincidental situation where two children are issued the same transaction port number.

The above approach is sufficient for most applications of a protective proxy because it detects whether the protective proxy is misconfigured to relay traffic to itself. However, there are situations where one or more protective proxies are placed in front of a network agent. When more than one protective proxy is in place, there is a risk that the combination of protective proxies will form a loop condition such as that shown in FIG. 1B.

In another embodiment of the loop detector, the specific network protocol is employed to relay connectivity information back to the protective proxy. Typically, in most application layer protocols (protocols that sit above the transport layer such TCP or UDP), upon establishing a connection by a client to a server, the server responds with an introductory message or greeting message. In the context described here, the application layer can refer to protocols residing in the so called session layer, presentation layer or application layer of the OSI (Open Systems Interconnection) seven-layer model of protocols. For example, in the SMTP protocol, a "220" reply message is sent by a mail server to a mail client upon the establishment of the connection. Often this message contains information such as the version and type of software the mail server is running in order to handle the SMTP session. In another example, when communicating with an SSH server, the server responds to the connection with the server and version number.

To implement loop detection, the protective proxy is constructed to respond to a connection by issuing its own initial greeting message. Unlike the low level loop detector described in the previous embodiment, the loop detector in this embodiment employs some knowledge of the protocol messages. The loop detector in the protective proxy embeds its connectivity information into the greeting message. Based on the connectivity information, the loop detector can determine if there is a loop in the configuration.

Figure 1B:
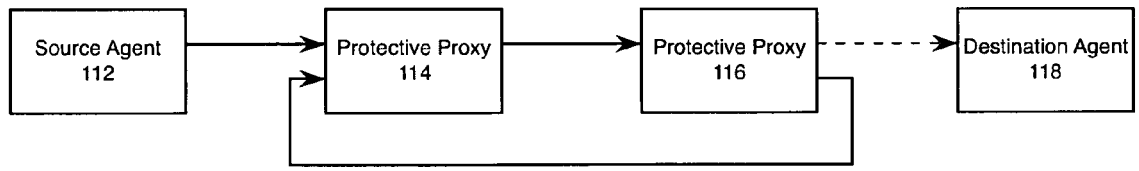
FIG. 1B (prior art) is a network diagram illustrating more than one protective proxy misconfigured into a loop.
Figure 2A:
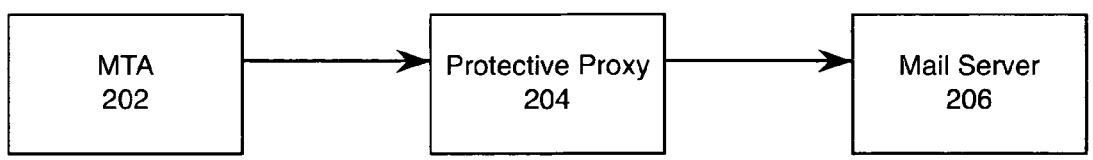
FIG. 2A (prior art) is a network diagram illustrating a protective proxy protecting a mail server from arbitrary MTA's.
Figure 2B:
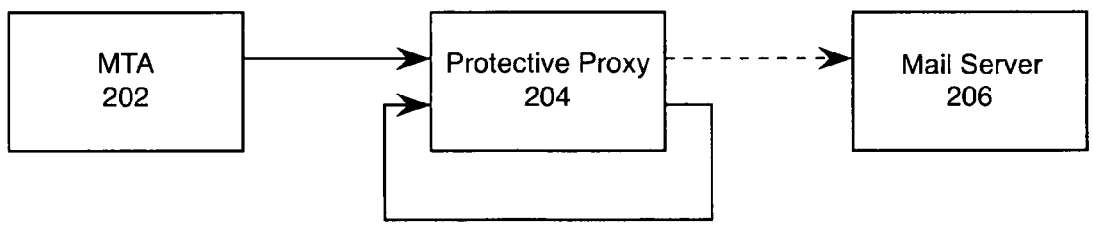
FIG. 2B (prior art) is a network diagram illustrating a misconfigured protective proxy looped to itself in a electronic mail setting.

FIG. 9A shows a mail system configuration misconfigured in the same manner as the general network diagram shown in FIG. 1B. As an example of the loop detection, MTA 902 establishes a connection with protective proxy 904 which immediately greets MTA 902 with a unique identifier identifying protective proxy 904. If MTA 902 is not a protective proxy, it will simply disregard the unique identifier. Protective proxy 904 then establishes a connection with protective proxy 906, which responds with a greeting message containing a unique identifier identifying protective proxy 906. Protective proxy 904 receives the greeting message and stores the fact it is connected to protective proxy 906. Protective proxy 906 then establishes a connection with protective proxy 904 because of a misconfiguration. Protective proxy 904 greets protective proxy 906 not only with its unique identifier but also with the fact it is connected to protective proxy 906. Protective proxy 906 then stores the fact it is connected to protective proxy 904, which is connected to protective proxy 906. Recognizing that protective proxy 906 is indirectly looped to itself, a loop is therefore detected.

However, if the mail system is properly configured with protective proxy 906 connected to mail server 908, the operation would be as follows. MTA 902 establishes a connection with protective proxy 904, which immediately greets MTA 902 with protective proxy 904's unique identifier. MTA 902 may disregard this information. Protective proxy 904 then establishes a connection with protective proxy 906 which greets protective proxy 904 with protective proxy 906's unique identifier. Protective proxy 904 records its connectivity information. Protective proxy 906 establishes a connection with mail server 908, which does not report any special information so protective proxy 906 has no connectivity information. In subsequent steps, communications between an external MTA such as MTA 902 and protective proxy 904, the fact that protective proxy 904 is connected to protective proxy 906 is included in the greeting message.

The unique identifier can be in the form of a unique number or string uniquely representing the protective proxy, which can include such examples as the MAC address or a serial number. Other examples would be apparent to one skilled in the art. In a situation where more than two protective proxies are connected together such as shown in FIG. 9B, the connectivity information can be even longer than the example shown above. For example, the connectivity information could be in the form: "protective proxy 914 is connected to protective proxy 916, which is connected to protective proxy 918". Also, one of skill in the art will recognize that the connectivity information can also be in the form of a graph if some of the protective proxies protect more than one agent. In FIG. 9C, protective proxy 924 protects both protective proxies 926 and 928. Protective proxy 928 protects protective proxy 930. The connectivity information built at protective proxy 924 can report that protective proxy 924 is connected to protective proxy 926 and protective proxy 928, which is connected to protective proxy 930. In this circumstance, the connectivity graph is in the form of a tree rather than a simple line. There are many well known techniques for detecting loops within graphs which are known to those of skill in the art.

It should be noted that initially the connectivity information at each protective proxy is incomplete. But as subsequent greetings are sent, more up-to-date connectivity information is transmitted so that eventually each protective proxy has a list or graph of all protective proxies being protected by it regardless of whether they are in direct or indirect connection.

Figure 10:
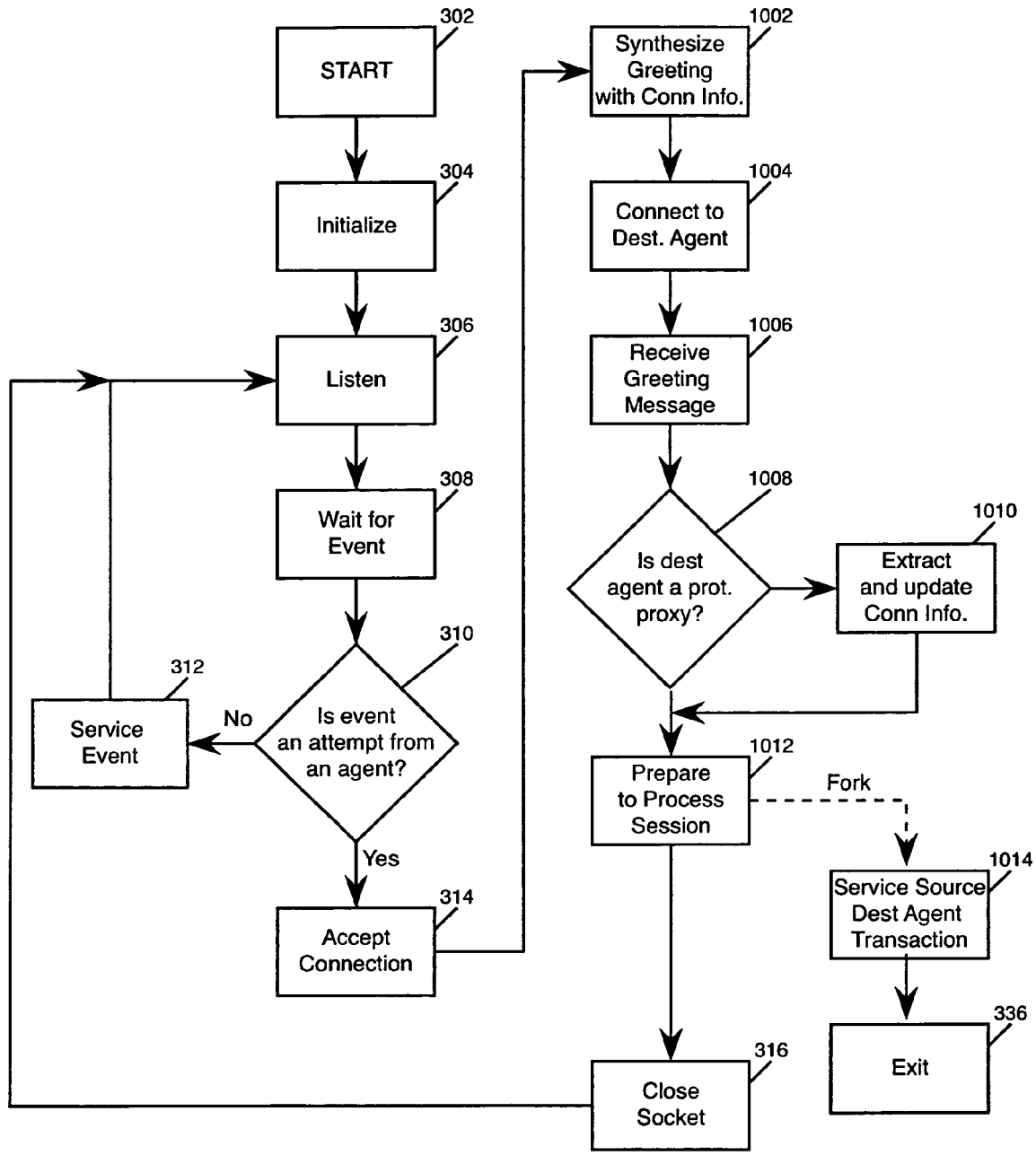
FIG. 10 is a flow chart illustrating the operation of an exemplary embodiment of a protective proxy equipped with a loop detector utilizing the application layer protocol's greeting message.

FIG. 10 is a flowchart illustrating the operation of a protective proxy equipped with this form of loop detector. The steps labeled 3xx are essentially the same as those described in FIG. 3 for a monitoring agent. Upon accepting the connection at step 314, the protective proxy synthesizes a protocol greeting message comprising as much connectivity information as the protective proxy has available at step 1002. At step 1004, the protective proxy connects to the destination agent. If for some reason the protective proxy is unable to connect to the destination agent, that information can be conveyed to the source agent later in a later protocol message. At step 1006, the greeting message is received. At step 1008, a determination is made as to whether the greeting message is from another protective proxy and whether the destination agent is a protective proxy. If so, at step 1010, the connectivity information of the destination agent is incorporated into the connectivity information of protective proxy to which this operation is presently described. In addition, upon the updating of the protective proxy's connectivity information, that information can be analyzed to determine if any loops exists. If a loop is detected, appropriate actions can be taken as described below. At step 1012, the protective proxy prepares to process the remainder of the session. Subsequently, at step 1014, a child process is forked (or a subordinate thread is created), and the remainder of the session between the source and destination agents is processed by the child. As a result, the parent process can close the communication socket at step 316 so that it can begin to service other connection requests from other source agents.

Figure 5A:
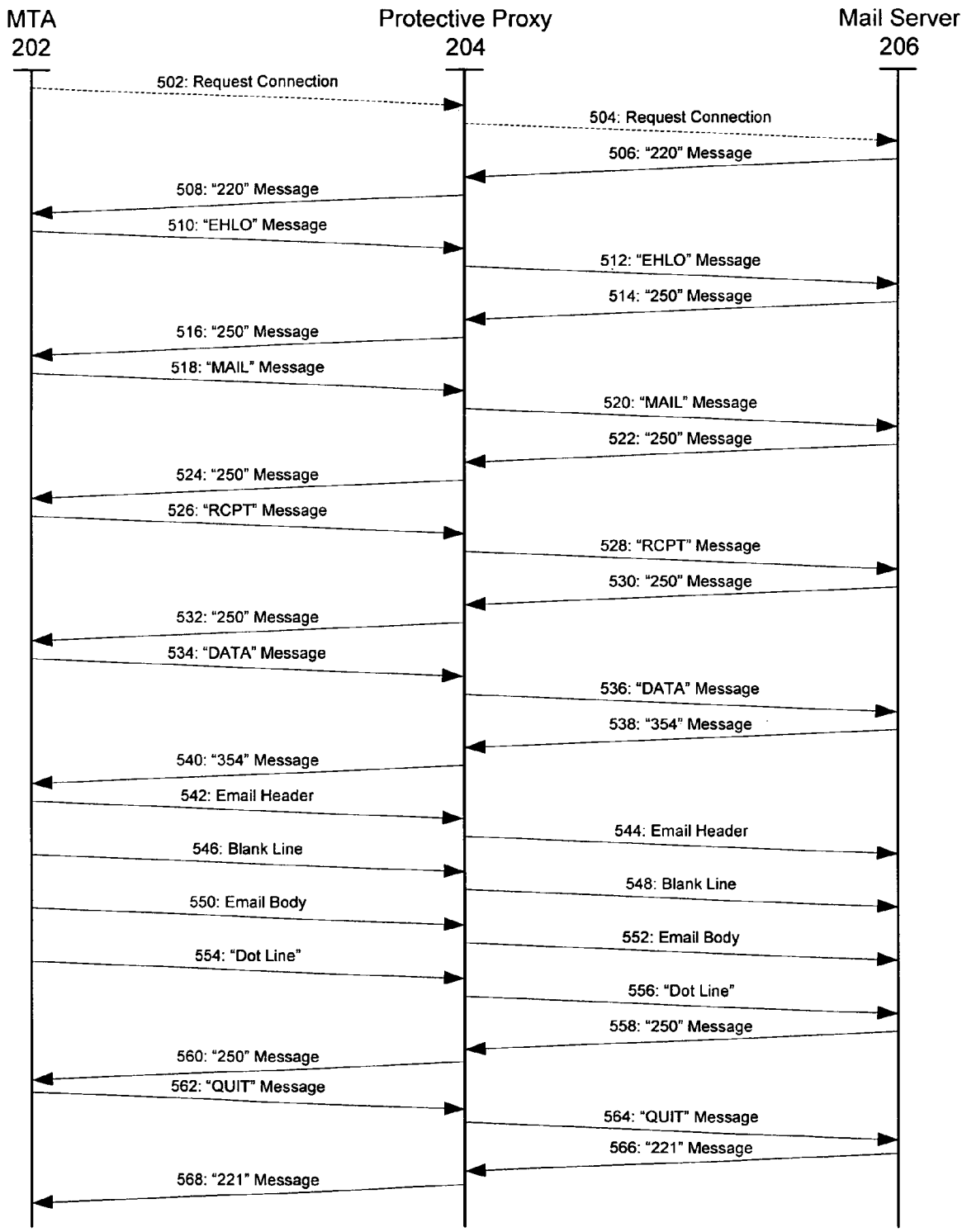
FIGS. 5A and 5B (prior art) are message diagrams illustrating an exemplary SMTP session between an MTA, a protective proxy and a mail server in situations where the protective proxy is properly configured and misconfigured into a loop, respectively.
Figure 5B:
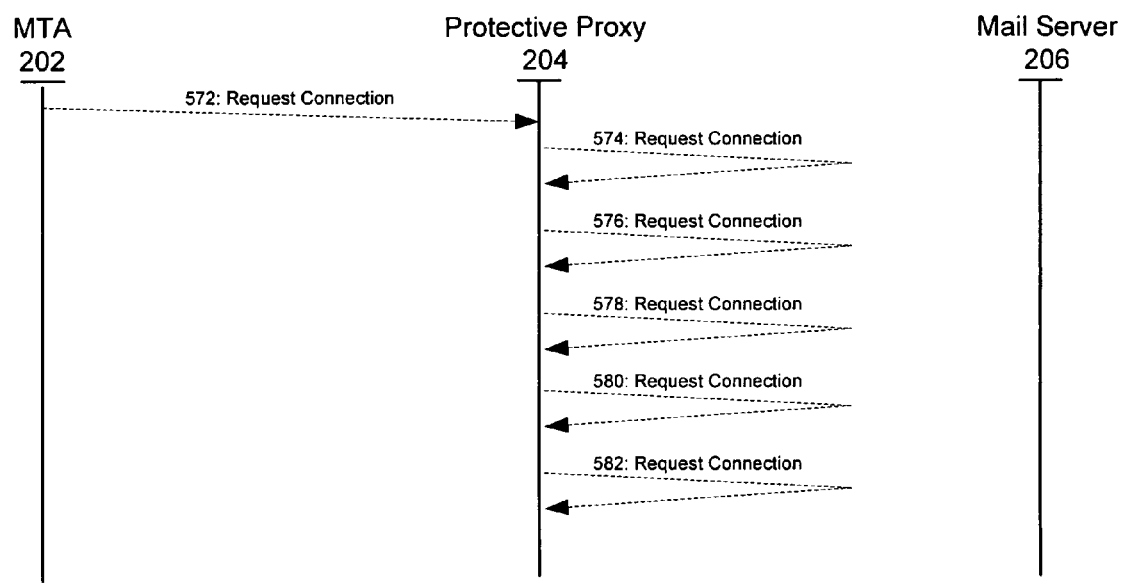
Figure 11:
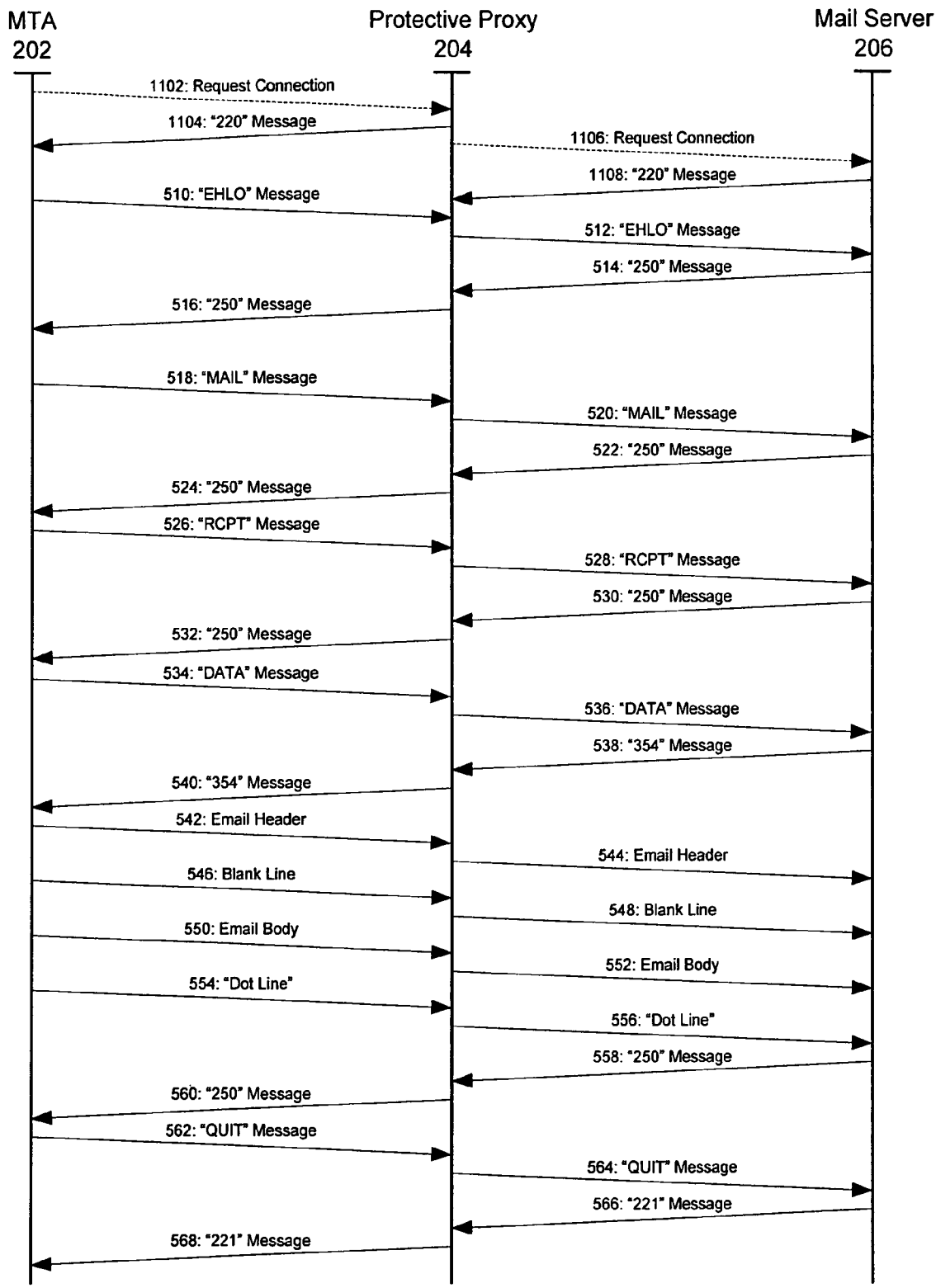
FIG. 11 is a message diagram showing an exemplary embodiment of an SMTP session in accordance with the operation shown in FIG. 10.

FIG. 11 shows the message sequence in the modified proxy communication. When MTA 202 requests a connection to protective proxy 204 at step 1102, protective proxy 204 immediately responds with a "220" greeting message 1104. Message 1104 also contains connectivity information related to protective proxy 204. Additionally, upon submission of the message 1104, protective proxy 204 then requests a connection with mail server 206 at step 1106. Mail server 206 responds with a "220" greeting message 1108. If mail server 206 is actually a protective proxy protecting a mail server, message 1108 can contain connectivity information about the protective proxy 206. Upon receiving message 1108, protective proxy 204 updates its connectivity information and determines if a loop exists. Meanwhile MTA 202 sends EHLO message 510, which could arrive either before or after message 1108. Providing that no loop exists or other actions need to be taken, the protocol then resumes in the same fashion as in FIG. 5.

In some protocols, the greeting message may have constraints on the length of the message that may provide insufficient length to encode the connectivity information. To address this potential difficulty, another embodiment of the loop detector uses the greeting message to notify a source agent that a connection has been established to a protective proxy equipped with a loop detector. If the source agent is not a protective proxy, it may discard this information. However, if the source agent is a protective proxy, it can engage in a connectivity reporting protocol before engaging in the remainder of the original application layer protocol. This can also be simply the augmentation of an existing protocol to encompass the transfer of connectivity information.

Figure 12:
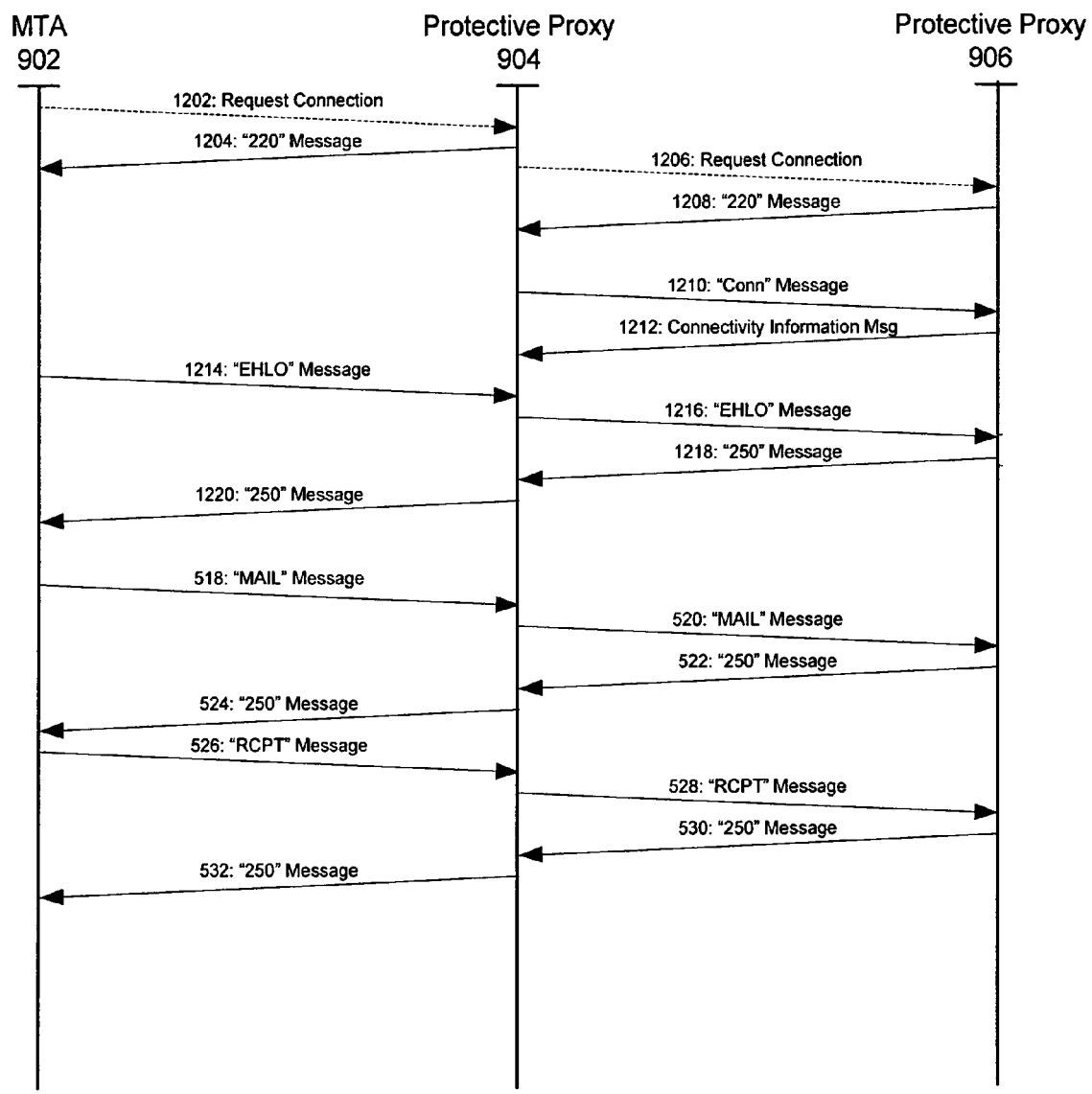
FIG. 12 is a message diagram showing an exemplary embodiment of the beginning of an SMTP session where the protective proxy employs a connectivity request message (CONN message).

FIG. 12 shows an example of the message transmission. For reference, the architecture in FIG. 9A is used, except protective proxy 906 is properly connected to mail server 908. MTA 902 initiates the session by establishing connection 1202 to protective proxy 904. Protective proxy 904 replies with a "220" greeting reply message 1204. Message 1204 has embedded within it the fact that the responding agent is a protective proxy. If MTA 902 is not a protective proxy, it would ignore this information. Protective proxy 904 establishes connection 1206 with protective proxy 906. Protective proxy 906 replies with a "220" greeting message 1208, which has embedded within it the fact that the responding agent is a protective proxy. Since Protective proxy 904 is a protective proxy, it then interrogates protective proxy 906 for its connectivity information. In this example, "CONN" command 1210 instructs protective proxy 906 to transmit its connectivity information in reply 1212. Protective proxy 906 also establishes a connection with mail server 908 (not shown). Meanwhile, MTA 902 in response to greeting message 1204 initiates the SMTP protocol with EHLO command 1214. Protective proxy 904 relays this as EHLO command 1216 to protective proxy 906. Protective proxy 906 relays the command to mail server 908. If operations are normal, protective proxy 906 receives a "250" reply message from the mail server, which proxy 906 relays as reply message 1218 to protective proxy 904. Proxy 904 in turn relays the "250" reply message as reply message 1220 to MTA 902. If mail server 908 generates a different reply message, it would be relayed back to MTA 902 in the same fashion. Furthermore, if protective proxy 906 could not communicate with mail server 908, it could synthesize an error reply to protective proxy 904 in response to EHLO command 1216, which could be relayed back to MTA 902. Similarly if protective proxy 904 could not communicate with protective proxy 906, it could synthesize an error reply to MTA 902 in response to EHLO command 1214. In any case, after MTA 902 receives reply message 1220, the SMTP protocol can resume normally as in FIG. 5 or as described by U.S. patent application Ser. No. 10/972,765.

A protective proxy can use the loop detectors described above to prevent a catastrophic failure. In one embodiment of a protective proxy, if a loop is detected, a loop-detected indicator is set. When the loop-detected indicator is set, the protective proxy can either issue a protocol level error message, such as a "4xx" or "5xx" error reply (see RFC 2821 which is hereby incorporated by reference) or simply refuse to accept connections. The loop-detected indicator can be cleared if an operator gives instructions to reset it, if the protective proxy is reconfigured, or if the protective proxy is configured to protect a different network proxy. In the low level loop detector embodiment described above, there is a small probability that a false loop is detected. Also, if there is a memory error, the loop-detected indicator could inadvertently be set. So for any of the above loop detector embodiments, the loop-detected indicator can be cleared after a fixed number of connection attempts, for example, after every 100 connection attempts. Alternatively, after a small percentage of the connection attempts, the loop-detected indicator is cleared. In this manner, if the loop-detected indicator is accidentally triggered, operator intervention is not needed to clear it.

In the loop detectors employing the greeting message, it may be an unnecessary burden on the system to constantly build the connectivity information. Furthermore, with a protocol extension to exchange connectivity information, it may be undesirable to add the additional messages as overhead in every transaction. To limit this, at each protective proxy once the connectivity information is completely received, no further interrogation or connectivity information updating is necessary until the protective proxy is reconfigured. When a proxy is reconfigured, any protective proxies protecting the reconfigured protective proxy are informed that the connectivity information needs to be updated.

One method of determining whether an update is necessary is to embed a small amount of information related to the connectivity information in the greeting reply message. If this small amount of information changes, then the protective proxy receiving the greeting reply message knows an update of the connectivity information is required. For example, the information could be a timestamp of the current connectivity information. If the timestamp is newer than that stored previously then a connectivity information upgrade is required. Likewise, a hash code or a checksum could also be used to determine whether an update is necessary.

While certain embodiments of the inventions have been described above, it will be understood that the embodiments described are by way of example only. Accordingly, the inventions should not be limited based on the described embodiments.

What is claimed:

1. A method performed by a network agent including a listening process and a servicing process, and operating according to a protocol layer above the data link layer in the Open System Interconnection Reference (OSI) Model, comprising:
   receiving a first connect request from a first source agent on a rendezvous port, wherein the receiving is performed by the listening process;
   negotiating a number of a first transaction port with the first source agent, wherein the negotiating is performed by the listening process;
   creating the servicing process for a first connection associated with the first connection request;
   requesting a second connection to a destination agent from the rendezvous port, wherein the requesting is performed by the servicing process;
   negotiating a number of a second transaction port with the destination agent, wherein the negotiating is performed by the servicing process;
   communicating the number of the second transaction port to the listening process from the servicing process;
   receiving a third connection request from a second source agent by the listening process on the rendezvous port;
   negotiating a number of a third transaction port with the second source agent, wherein the negotiating is performed by the listening process;
   comparing the number of the third transaction port to the number of the second transaction port received by the listening process from the servicing process;

indicating that a loop is detected if the number of the third transaction port matches the number of the second transaction port received from the servicing process;

wherein the indicating that the loop is detected comprises setting a loop-detected indicator; and wherein the network agent is a protective proxy further configured to refuse connections or to issue a protocol error message when a subsequent connection request is received and the loop-detected indicator is set.

2. The method of claim 1, wherein the communicating the number of the second transaction port comprises:

creating a first-in first-out (FIFO) pipe between the listening process and the servicing process; and communicating the number of the second transaction port through the FIFO pipe.

3. The method of claim 1, wherein the communicating the number of the second transaction port comprises:

creating a socket between the listening process and the servicing process;

writing the number of the second transaction port to the socket, wherein the writing is performed by the servicing process; and reading the number of the second transaction port from the socket, wherein the reading is performed by the listening process.

4. The method of claim 1, wherein the communicating the number of the second transaction port comprises:

storing the number of the second transaction port in a predesignated area of shared memory, wherein the storing is performed by the servicing process; and reading the number of the second transaction port from the predesignated area of shared memory, wherein the reading is performed by the listening process.

5. The method of claim 1, wherein the communicating the number of the second transaction port comprises:

creating a System V IPC message comprising the number of the second transaction port, wherein the creating is performed by the servicing process;

placing in the System V IPC message into a System V IPC queue, wherein the placing is performed by the servicing process;

retrieving the System V IPC message from the System V IPC queue, wherein the retrieving is performed by the listening process.

6. The method of claim 1, wherein the loop-detected indicator is cleared after a predetermined number of connection requests.

7. The method of claim 1, wherein the loop-detected indicator is cleared based on a predetermined probability.

8. A method performed by a network agent operating according to an application layer protocol, comprising:

receiving a first connection request from a source agent according to a transport layer protocol;

synthesizing a first greeting message according to the application layer protocol, the first greeting message comprising connectivity information of the network agent;

transmitting the first greeting message to the source agent according to the application layer protocol;

transmitting a second connection request to a destination agent according to the transport layer protocol;

receiving a second greeting message from the destination agent according to the application layer protocol;

determining if the second greeting message contains connectivity information of the destination agent;

updating the connectivity information of the network agent with the connectivity information of the destination agent if the second greeting message contains the connectivity information of the destination agent;

determining whether a loop exists by comparing the connectivity information of the network agent to the connectivity information of the destination agent; and indicating that the loop is detected if the loop is determined to exist;

wherein the indicating that the loop is detected comprises setting a loop-detected indicator; and wherein the network agent is a protective proxy further configured to refuse connections or to issue a protocol error message when the network agent receives a subsequent connection request and the loop-detected indicator is set.

9. The method of claim 8, wherein the loop-detected indicator is cleared after a predetermined number of connection requests.

10. The method of claim 8, wherein the loop-detected indicator is cleared based on a predetermined probability.

11. A method performed by a network agent operating according to an application layer protocol having an extension for transferring connectivity information, comprising:

receiving a first connection request from a source agent according to a transport layer protocol;

synthesizing a first greeting message according to the application layer protocol, the first greeting message comprising a first extension indication, the first extension indication signifying that the network agent is equipped to interpret the extension to the application layer protocol;

transmitting the first greeting message to the source agent according to the application layer protocol;

receiving a second greeting message from the destination agent; determining if the second greeting message contains a second extension indication, the second extension indication signifying that the destination agent is equipped to interpret the extension to the application layer protocol;

obtaining connectivity information of the destination agent by interrogating the destination agent using the extension to the application layer protocol if the second extension indication is present in the second greeting message;

updating connectivity information of the network agent with the connectivity information of the destination agent if the second extension indication is present in the second greeting message;

determining whether a loop exists by comparing the connectivity information of the network agent to the connectivity information of the destination agent;

indicating that the loop is detected if the loop is determined to exist;

wherein the indicating that the loop is detected comprises setting a loop-detected indicator; and wherein the network agent is a protective proxy further configured to refuse connections or to issue a protocol error message when the network agent receives a subsequent connection request and the loop-detected indicator is set.

12. The method of claim 11, wherein the loop-detected indicator is cleared after a predetermined number of connection requests.

13. The method of claim 11, wherein the loop-detected indicator is cleared based on a predetermined probability.

* * * * *